Sept. 27, 1966  G. A. DECKER ET AL  3,275,919
RECHARGER CONTACTS FOR ELECTRIC TOOTHBRUSH
Filed Sept. 9, 1963
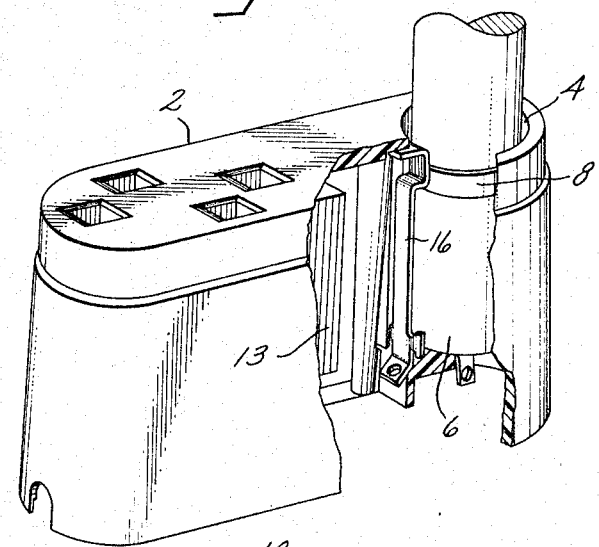
Fig. 1.
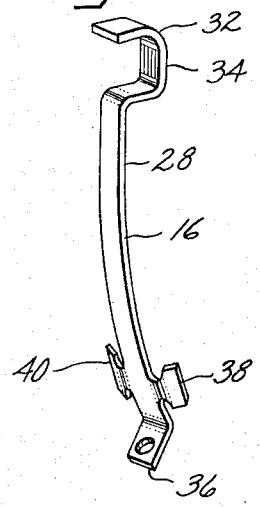
Fig. 3.
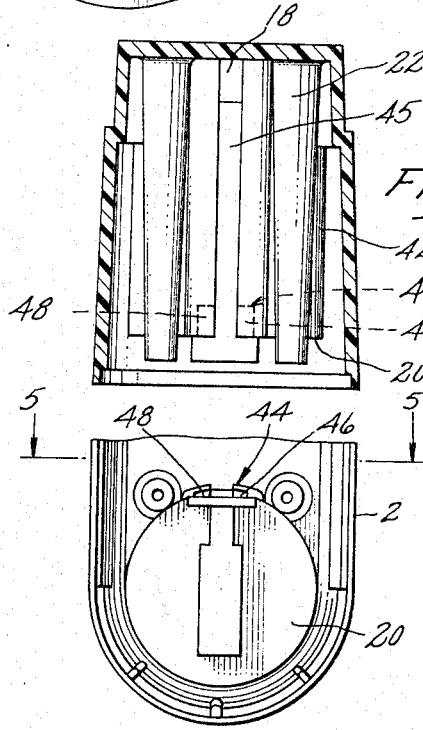
Fig. 5.
Fig. 4.
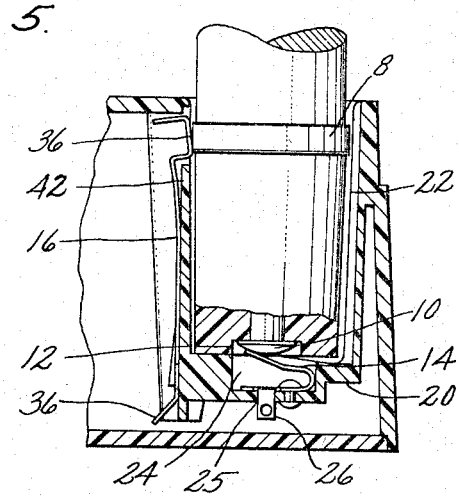
Fig. 2.
Inventors:
George A. Decker,
Daniels B. Fisk,
by Leonard J. Platt
Their Attorney

United States Patent Office 3,275,919
Patented Sept. 27, 1966

3,275,919
RECHARGER CONTACTS FOR ELECTRIC TOOTHBRUSH
George A. Decker, Wakefield, R.I., and Daniels B. Fisk, Framingham, Mass., assignors to General Electric Company, a corporation of New York
Filed Sept. 9, 1963, Ser. No. 307,634
3 Claims. (Cl. 320—2)

This invention relates to electric toothbrushes and, more particularly, to rechargeable, battery-operated toothbrushes.

It is an object of this invention to provide a storage case and battery charger for an electric toothbrush having an improved means for completing a recharging circuit.

It is a further object of this invention to provide a storage case and battery charger for an electric toothbrush having an improved charging contact which is inexpensive to manufacture, easy to assemble and repair, and readily accessible for interconnection with the recharging circuit.

Further objects and attendant advantages of this invention will become better understood from the following description and the features of novelty which characterize this invention will be pointed out with particularity in the claims annexed to and forming part of this specification.

Briefly stated, this invention, in one form, includes a storage case and battery charger having a socket formed therein for receiving a motorized toothbrush handle containing a rechargeable battery. A charging contact is provided in the bottom of the socket and a second charging contact is provided in the socket side wall for electrically connecting the handle to a battery charging device contained in the storage case. The contact in the socket side wall is an elongated member mounted at one end thereof on the outside of the side wall adjacent to the bottom of the socket, the other end of the contact having a projection formed thereon which protrudes through an aperture in the socket side wall.

In the drawing, FIG. 1 is a perspective view of a storage case with a cutaway section, illustrating one embodiment of the present invention.

FIG. 2 is a partial sectional elevation view of the storage case.

FIG. 3 is a perspective view of the side wall charging contact.

FIG. 4 is a partial bottom view of the storage case, illustrating the mounting for the side wall contact.

FIG. 5 is an elevational end view of the storage case socket illustrating the contact receiving groove and recesses.

Referring now to the drawing, and more particularly to FIG. 1, there is shown a housing or case 2 having a socket 4 formed therein. The socket is adapted to receive one end of a motorized toothbrush handle 6. The housing 2 is preferably molded from plastic or similar material having such properties as to provide a lightweight, easily washable housing which is inexpensive to fabricate and which is a good electrical insulator. For driving a toothbrush (not shown) there is provided in the handle 6 a small electric motor (not shown) having a pair of terminal contacts. One of these contacts is in the form of a terminal ring 8 which extends completely around the handle. The other of these contacts is in the form of a terminal button 10 positioned within a centrally located recessed portion 12 at the lower end of the handle 6 as may be seen in FIG. 2.

In accordance with the invention the handle is electrically interconnected with a battery charger 13 through two charging contacts provided in the storage case socket. One charging contact 14 is provided in the bottom wall of the socket for engaging the terminal button 10 on the lower end of the handle 6. The other charging contact 16 is mounted adjacent to a side wall of the socket and a portion thereof protrudes through an aperture 18 formed in the side wall of the socket for contacting the terminal ring 8 of the hande. This arrangement negates the need for careful insertion of the handle 6 in the socket 4 and provides for permitting rotation of the handle within the socket causing the terminal contacts 8, 10 to slide over the charging contacts 16, 14, respectively, thereby wiping the contact surfaces clean and insuring positive electrical contact.

The socket has a bottom wall 20 and a cylindrical side wall 22. The bottom wall 20 has an elongated groove 24 formed therein for receiving the charging contact 14 which is formed as a stamped metal member folded to form a contacting surface flexibly biased toward the terminal button 10. A pair of slots, one of which is shown at 25, are provided passing through the bottom wall 20. Each slot receives an appendage 26 extending from the lower end of the charging contact 14, the appendages providing the terminal means for electrically connecting the contact 14 to the battery charger 13.

The side wall charging contact 16 is designed to provide a contact surface at a relatively inaccessible location in the socket but which is easily assembled, repaired, or replaced and, furthermore, to provide a contact which retains its resiliency and which does not tend to become permanently deformed by constant use. The side wall contact 16 is formed of a pressed sheet metal member having an elongated central body 28. One end 32 of the contact is deformed to provide a projection 34 thereon, the projection functioning as a contact surface which coacts with the terminal ring 8. The other end 36 of the contact 16 is bent obliquely in the direction opposite to the direction of deformation of the projection 34 as may be seen in FIG. 3 to provide a terminal to which the battery charger 13 is connected. Spaced from the latter end 36 of the contact are formed a pair of mounting ears 38, 40, the ears being bent slightly in the same direction as the projection 34 to conform to the shape or curvature of the socket side wall 22.

The side wall contact 16 is supported on the outside surface 42 of the socket side wall 22 by mounting means 44 provided thereon. Mounting means includes an elongated shallow groove 45 cut into the outside surface 42 commencing at the aperture 18 and extending substantially the entire length of the side wall 22 (FIG. 5). Recesses 46, 48 for receiving the ears 38, 40, respectively, are provided beneath the outside surface 42 of the socket side wall, the recesses extending upwardly from the bottom of the socket and communicating with the groove 45. The elongated central body 28 is received by the groove 45 cut within the outer wall and the projection 34 protrudes through the aperture 18. The end 36 of the contact 16 extends from the socket side wall due to its being bent away from the wall and provides an easily accessible portion to which the battery charger 13 is electrically connected.

The side wall contact 16 is easily mounted on the socket by sliding the contact upwardly causing the ears 38, 40 to slide into the recesses 46, 48 until the projection 34 snaps into the aperture 18 providing a contact surface in the inside of the socket 4 near its upper surface. The resiliency of the ears 38, 40 provide a wedged fit of the ears in the recesses 46, 48. By mounting the side wall contact at its lower end, a resilient cantilever contact member is provided having a resiliency which is long lasting, resulting in a contact having a long life and one which will not tend to become permanently deformed by the constant pressure of the handle 6 and terminal 8 inserted within the socket. The resiliency of the contact insures a good constant contact with the terminal ring 8. Insertion and removal of the handle and rotation of the handle provides a wiping function which insures good contact between the terminal ring 8 and the side wall contact 16.

In operation, on termination of use of the electric toothbrush, the handle is replaced within the storage case socket 4 in such a manner that button terminal 10 comes in contact with the charging contact 14 supplied in the bottom wall of the socket and the terminal ring 8 comes in contact with the side wall charging contact 16. This completes a circuit including the batteries located within the handle and the battery charger 13, effecting recharging of batteries during nonuse of the electric toothbrush.

Although the specific apparatus has been shown and described above, it will be apparent to those skilled in the art that numerous changes, combinations and substitutions of equivalents might be made. It is therefore contemplated by the claims which conclude the specification to cover all such modifications as fall within the true spirit and scope of this invention.

We claim:

1. A storage case and battery charger for an electric toothbrush comprising:
   (a) a housing having a socket formed therein for receiving a motorized toothbrush handle containing a rechargeable battery, said socket having a bottom wall and a side wall, said side wall having an aperture near the upper surface thereof,
   (b) a first charging contact positioned within a first recess formed in said bottom wall for engaging a terminal located on one end of said handle,
   (c) a second charging contact for engaging a terminal located on an outside surface of said handle, said second charging contact comprising a flat, electrically conductive, resilient, elongated member, a first end of said member being deformed to provide a projection thereon, said projection protruding inwardly through said side wall aperture, an ear being formed near the second end of said member, said ear being bent in the same direction as said projection to approximately conform to the shape of said side wall, and
   (d) means for mounting said second charging contact on the outside surface of said side wall at a point adjacent said bottom wall, said mounting means including a recess on said outside surface for receiving said ear, the resiliency of said ear providing a wedged fit of said ear in said recess,
   whereby said second charging contact is mounted on said surface by sliding said second charging contact upwardly causing said ear to fit within said recess, said member to be received by said groove and said projection to protrude inwardly through said aperture.

2. A storage case and battery charger for an electric toothbrush comprising:
   (a) a housing having a socket formed therein for receiving a motorized toothbrush handle containing a rechargeable battery, said socket having a bottom wall and a side wall, said side wall having an aperture near the upper surface thereof,
   (b) a first charging contact for engaging a first terminal located on said handle,
   (c) a second charging contact for engaging a second terminal located on said handle, said second charging contact comprising an electrically conductive, resilient, elongated member having a projection extending transversely from one end thereof, said projection protruding inwardly through said side wall aperture,
   (d) means for mounting said second charging contact on the outside surface of said side wall at a point adjacent said bottom wall,
   (e) said mounting means including a recess in the outside surface of said wall, and
   (f) said second charging contact having an ear on the other end therefor, said ear being received by said recess for mounting said second charging contact on said side wall.

3. A storage case and battery charger for an electric toothbrush as defined in claim 2 wherein:
   (a) said ear is bent in the same direction as said projection to approximately conform to the shape of said side wall, the resiliency of said ear providing a wedged fit of said second charging contact in said recess, and wherein
   (b) an elongated groove is provided in said outside surface extending downwardly from said aperture to the bottom of said side wall, said groove communicating with said recess,
   whereby said second charging contact is mounted on said surface by sliding said second charging contact upwardly causing said ear to fit within said recess, said member to be received by said groove and said projection to protrude inwardly through said aperture.

References Cited by the Examiner

UNITED STATES PATENTS

| 2,477,013 | 7/1949 | Spencer et al. | 339—182 X |
| 2,876,410 | 3/1959 | Fry | 320—48 |
| 3,143,697 | 8/1964 | Springer | 320—2 |
| 3,209,230 | 9/1965 | Mas | 320—2 |

JOHN F. COUCH, *Primary Examiner.*

LLOYD McCOLLUM, *Examiner.*

S. WEINBERG, *Assistant Examiner.*